May 25, 1926. 1,586,108
S. G. NEAL
QUICK ACTION DIAPHRAGM OPERATED VALVE
Filed May 27, 1925 2 Sheets-Sheet 2
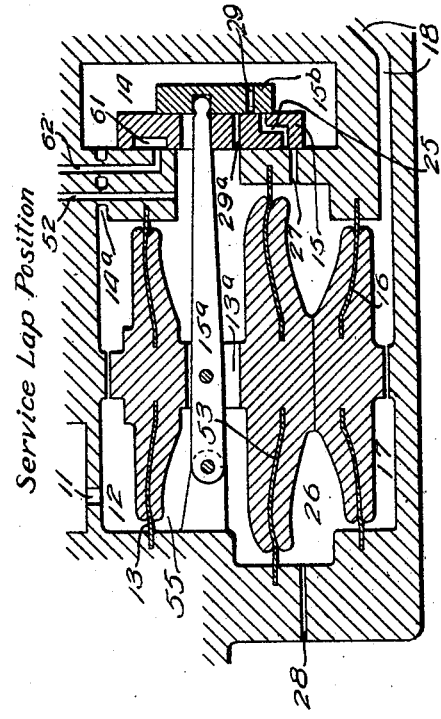
Fig.4. Service Lap Position
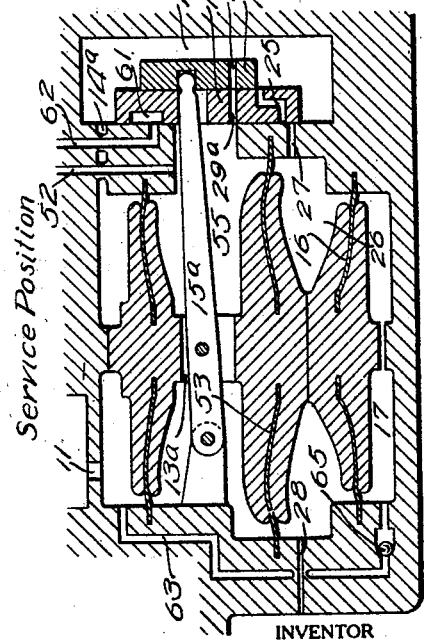
Fig.5.
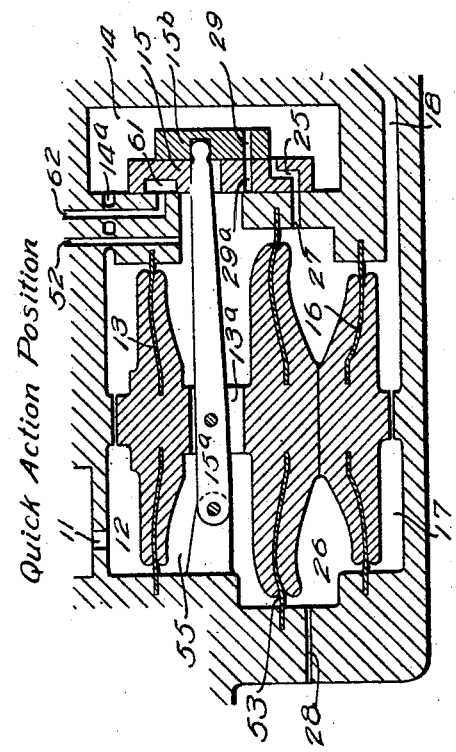
Fig.2. Quick Action Position
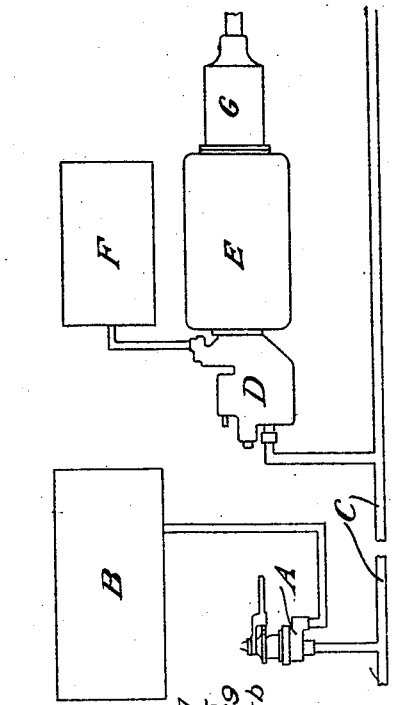
Fig.3. Service Position
INVENTOR
Spencer G. Neal
BY
ATTORNEYS Patented May 25, 1926.

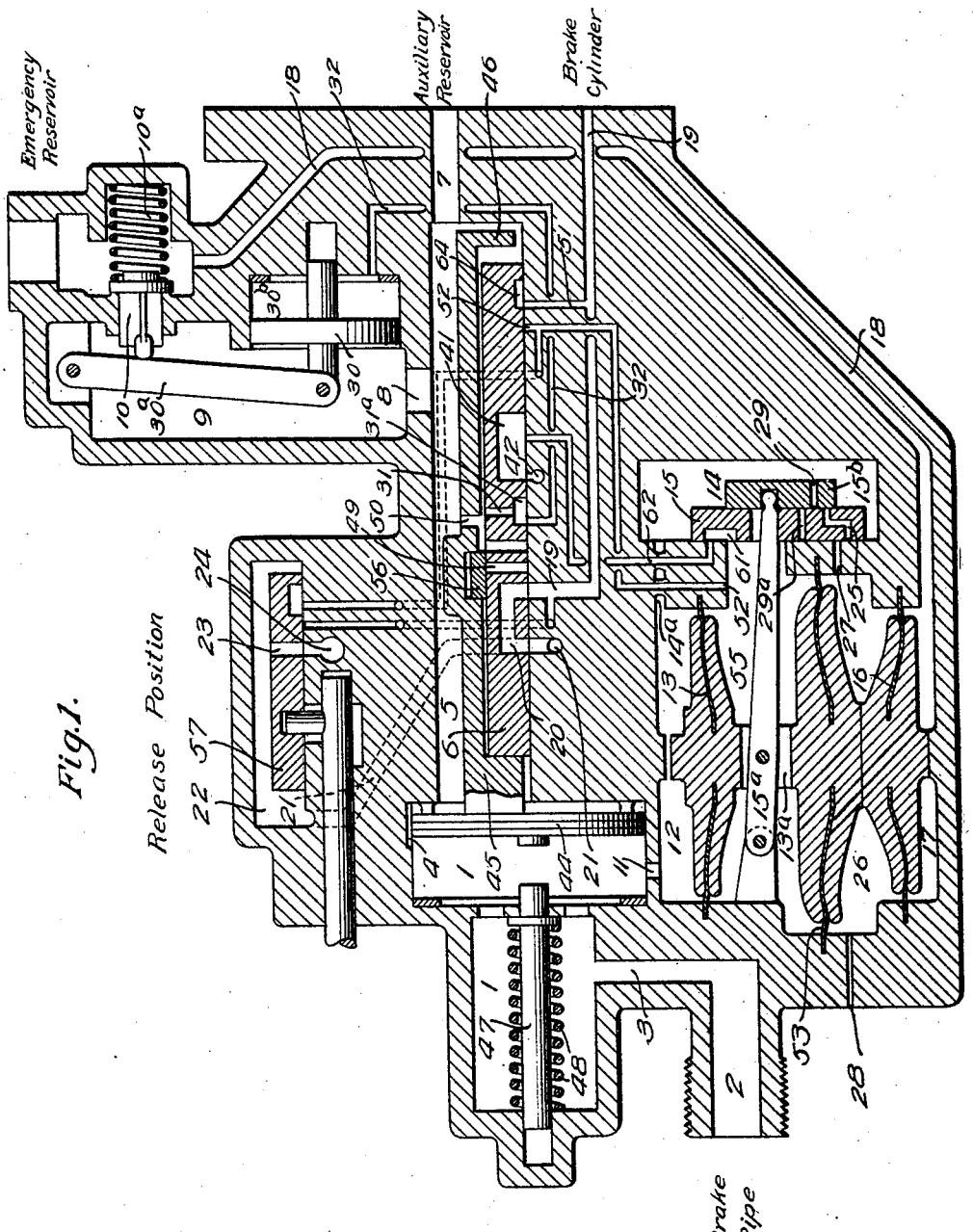

1,586,108

UNITED STATES PATENT OFFICE.

SPENCER G. NEAL, OF NEW YORK, N. Y., ASSIGNOR TO AUTOMATIC STRAIGHT AIR BRAKE COMPANY, OF NEW CASTLE, DELAWARE, A CORPORATION OF DELAWARE.

QUICK-ACTION DIAPHRAGM-OPERATED VALVE.

Application filed May 27, 1925. Serial No. 33,182.

In apparatus where a valve, or other operating part or device, is moved through the operation of a diaphragm, and wherein the diaphragm is flexed by varying the pressures on opposite sides thereof, the movement of the diaphragm and the connected part is slow. The valve is given what might be termed a creeping movement. This is due to the fact that the diaphragm moves in response to the variations in pressures; as one pressure is decreased or increased below or above the opposing pressure the diaphragm moves and this resulting movement is rather slow. The connected valve or other operating part or device moves slowly or creeps to its final position. In some types of apparatus this is not desirable because to ensure the quick and satisfactory operation of the apparatus the diaphragm must be given a quick action so that the connected part will be snapped into its final position.

It is the object of this invention to provide a diaphragm structure controlled by opposing pressures and which will be given a quick or snap action in response to variations in the controlling pressures.

The invention is illustrated as applied to a type of triple valve for air brake apparatus. This triple valve is fully described in my pending application for patent, Serial No. 9789, filed February 17, 1925, certain features of that triple valve being omitted because it is unnecessary to illustrate them in this case and in order to simplify the showing.

The invention may be applied to the triple valves illustrated in Patents Nos. 1,411,468 and 1,502,519, dated April 4, 1922, and July 22, 1924, respectively.

While the invention is illustrated and described in connection with an air brake apparatus it is to be understood that it may be applied to any form of valve or device operated by a diaphragm and in which the movement of the diaphragm is brought about by establishing a difference in pressures on opposite sides of the diaphragm.

In the drawings:—

Fig. 1 is a diagrammatic view showing the invention applied to a triple valve for air brake apparatus, the parts of the triple valve being shown in release position;

Fig. 2 a diagrammatic sectional view of the diaphragm structure showing the parts in quick-action position, the diaphragm structure and the pilot valve operated thereby having made a partial movement toward service position;

Fig. 3 a view similar to Fig. 2 showing the parts in full service position;

Fig. 4 a view similar to Fig. 2 showing the pilot graduating valve in service lap position; and Fig. 5 a diagrammatic view of a portion of an air brake apparatus.

Referring to Fig. 5 A designates an engineer's brake valve; B a main reservoir; C a brake pipe; D a triple valve; E an auxiliary reservoir; F an emergency reservoir, and G a brake cylinder.

The system is charged by increasing the brake pipe pressure, as in the present standard Westinghouse-type of air brake apparatus. The air pressure from the brake pipe flows through the brake pipe connection 2, the connected passage 3 into the main piston chamber 1. The increasing pressure in chamber 1 forces the main piston 44 inwardly, toward the right hand as viewed in the drawings. Connected to the piston is the usual valve stem 45, said stem extending inwardly through the main slide valve chamber 5 and being connected to the main slide valve 6 and the graduating valve 56 in the usual manner. The piston stem is connected to the main slide valve by a lost motion connection and the graduating valve is connected directly to the said stem as is usual in this type of apparatus. The main slide valve operates on a main slide valve seat through which various ports and passages are formed. With the main piston in full release and charging position a charging groove 4 is uncovered so that air may flow from chamber 1 through said groove past the piston 44 and into the main slide valve chamber 5. The main slide valve chamber is connected directly to the auxiliary reservoir through passage 7. The chamber 5 is also connected to an emergency reservoir through passage 8, chamber 9 and a port controlled by a spring-pressed check valve 10. The spring 10ª normally holds the check valve seated and the rising pressure in chamber 9 will unseat said valve and open communication between chamber 9 and the emergency reservoir. The auxiliary reservoir and the emergency reservoir will therefore be charged at the same time and at the same rate. From chamber 1 brake pipe air will flow through the passage 11 into an actuating chamber 12 of the diaphragm structure. The lower wall of chamber 12 is formed by an actuating diaphragm 13. Spaced a suitable distance below the diaphragm 13 is a larger equalizing diaphragm 53, said diaphragm being considerably larger in area than the actuating diaphragm 13. The diaphragms 13 and 53 form the upper and lower walls of a brake cylinder equalizing chamber 55. Below the equalizing diaphragm 53 is arranged a controlling diaphragm 16, this diaphragm being of the same area as the actuating diaphragm 13. Between the diaphragms 53 and 16 is formed a quick-action chamber 26; and below the controlling diaphragm 16 is formed a control pressure chamber 17. This latter chamber is connected to the emergency reservoir by passage 18 so that said chamber will be charged with emergency reservoir air.

The diaphragms 13 and 53 are rigidly connected together at their centers by a stem 13$^a$ and move up and down together. All of these diaphragms have a limited up and down movement, suitable stops being provided for that purpose. In the brake cylinder equalizing chamber 55 is arranged a horizontal lever 15$^a$ which is pivotally connected to the stem 13$^a$. One end of said lever is pivotally connected to the valve casing, its other end being operatively connected to a pilot valve 15 and to a graduating pilot valve 15$^b$, said valves being arranged in a valve chamber 14. The lever 15$^a$ extends through a slot in the valve 15, its end being directly connected to the graduating pilot valve 15$^b$. The slot in the pilot valve permits of a limited independent movement of the graduating valve and the graduating valve moves on the pilot valve for this limited distance. The pilot valve is held on its seat and the graduating pilot valve is held to the pilot valve by any suitable yielding means. The chamber 14 is directly connected to the brake pipe chamber 12 by a passage 14$^a$ so that brake pipe chamber pressure will always be registered in the chamber 14 and the pressures in the chambers 12 and 14 will always be equal.

With the triple valve parts in full release and charging position, with the release governing valve in quick release position, as shown in Fig. 1, the brake cylinder is in direct communication with atmosphere through brake cylinder passage 19, cavity 20 of the main slide valve, passage 21 which leads direct to the release governing valve chamber 22, and from this chamber to atmosphere through port 23 in the release governing valve 57, and main atmospheric port 24.

The check valve 10 is opened for emergency applications of the brakes by means of a piston 30 and a lever 30$^a$ connected thereto and adapted to bear on the projecting end of the valve 10. The piston 30 reciprocates in a chamber 30$^b$ and said chamber is charged from the main slide valve chamber through port 31 and cavity 31$^a$ in the main slide valve and port and passage 32 which leads from the main slide valve seat into chamber 30$^b$. The piston 30 therefore is subject on one side to the pressure in chamber 9 and on its other side to the pressure in chamber 30$^b$ and said piston remains inoperative in all positions of the main slide valve except the emergency position.

A service application of the brakes is brought about by a service reduction in brake pipe pressure through the brake valve A in the usual manner and the pressure in chamber 1 will be reduced below the auxiliary pressure in chamber 5. The main and graduating valves will be moved toward the left by the superior auxiliary reservoir pressure in chamber 5. The initial movement of the piston and the stem 45 will first take up the lost motion between the extension 46 of the stem and the main slide valve. This initial movement will also move the graduating valve to uncover the service port 49 in the main slide valve. Thereafter the main slide valve will move with the piston stem until the piston engages the graduating stem 47 where it will be stopped in service position. The movement of the main slide valve to service position closes communication between the brake cylinder passage 19 and the release cavity 20 of the slide valve 6, and the service port 49 is brought into register with the brake cylinder passage 19. Auxiliary reservoir air is then free to flow from chamber 5 direct to the brake cylinder through passage 50 in the stem 45, port 49 of the main slide valve and the brake cylinder passage 19 which leads direct to the brake cylinder. The brake cylinder will be connected to the equalizing chamber 55 of the pilot valve structure through passage 51, cavity 64 of the main slide valve and passage 52 which leads direct to chamber 55. This communication permits the supplementary or pilot valve to both supply and release air from the brake cylinder so long as the main slide valve 6 is in service position.

The reduction of brake pipe pressure in chamber 1 will result in a corresponding reduction of pressure in the actuating chamber 12 of the diaphragm structure, resulting in an upward movement of the diaphragm structure. This upward movement results from the reduction of the pressure in chamber 12 below the undisturbed emergency reservoir pressure in chamber 17 beneath the diaphragm 16.

The lever 15$^a$ will be carried upwardly and the graduating pilot valve will be moved independently of the pilot valve 15 until the lever reaches the upper end of the slot in the pilot valve. This independent movement of the graduating pilot valve will place port 29 of said valve in register with port 29ª of the pilot valve. This movement of the graduating pilot valve will uncover quick-action port 25 of the pilot valve. The continued upward movement of the diaphragm structure and lever 15ª will now move the two valves together and bring port 25 into communication with port 27 leading into the quick-action chamber 26. Quick action chamber 26 will now be in direct communication with the chamber 14 and brake pipe air will flow directly into said chamber. The flow of brake pipe air directly into chamber 26 will result in a quick upward movement of the diaphragms because of the large area of diaphragm 53. The pressure in chamber 26 will assist the undisturbed emergency reservoir pressure in chamber 17 to force the diaphragm structure and the pilot valve to full service position. The flow of air into chamber 26 gives a quick impulse to the diaphragm structure and carries the pilot valve to service position with a quick snap action. The movement of the pilot valve from quick-action position, as shown in Fig. 2, to full service position, as shown in Fig. 3, will cause the pilot valve to close port 27 and to bring port 29ª into communication with the chamber 55. Port 27 is closed before the port 29ª is fully opened so that the flow of air into chamber 26 is stopped before brake cylinder pressure starts to build up in chamber 55. Chamber 26 is provided with an atmospheric leak port 28 so that the air that flowed into chamber 26 through port 27 may leak down to atmosphere through port 28. The purpose of this is to remove the pressure from chamber 26 so that it will not influence or affect the build-up of brake cylinder pressure in the brake cylinder equalizing chamber 55. When the pilot valve 15 has been moved upwardly into service position brake pipe air will flow to the brake cylinder through port 29 in the pilot valve, equalizing chamber 55, passage 52, cavity 64 of the main slide valve and passage 51 which leads direct into the brake cylinder passage 19. It is therefore clear that in the service position of the main slide valve air will flow to the brake cylinder from auxiliary reservoir through the main slide valve and also from the brake pipe to the brake cylinder through the independent pilot valve.

The means which establishes the dual communication between the auxiliary reservoir and the brake cylinder, and the brake pipe and the brake cylinder, are lapped independently of each other. The main valve means controlling communication between the auxiliary reservoir and the brake cylinder will be operated to the right to cause the graduating valve to cut off communication between chamber 5 and port 49 of the slide valve when the pressure in chamber 5 has been reduced slightly below the brake pipe pressure in chamber 1. The connection between the brake pipe and the brake cylinder controlled by the secondary valve means is closed when a given brake cylinder pressure has been developed, this pressure being registered at all times in the equalizing chamber 55, and when this pressure is raised to a point where the reduced brake pipe pressure in chamber 12 and the increase in pressure in the equalizing chamber 55 will oppose and dominate the undisturbed emergency reservoir pressure in chamber 17, the graduating pilot valve 15ᵇ will be moved downward to lap position and the service port 29ª of the pilot valve will be closed (see Fig. 4). The diaphragm 53 is so proportioned to the diaphragms 13 and 16 that the desired brake cylinder pressure will be built up in the brake cylinder before the graduating pilot valve will be moved to lap position. This diaphragm is larger than the diaphragms 13 and 16 and preferably is so proportioned that the brake cylinder pressure will be built up two and one half times the amount of the brake pipe reduction, that is to say, for a ten pound brake pipe reduction a twenty-five pound brake cylinder pressure will be built up before the graduating pilot valve is moved to lap position. The movement of the graduating pilot valve to lap position closes the quick-action port 25.

A release of brake cylinder pressure is obtained by increasing the brake pipe pressure through the brake valve A in the usual manner, thereby increasing the pressures in chambers 1 and 12. The increase of pressure in chamber 1 will move the main piston and the main and graduating valves to release position as shown in Fig. 1. The increase of pressure in chamber 12 will move the diaphragm structure downwardly and will carry the pilot valve and the graduating pilot valve to release position. The quick-action port 25 will pass over the port 27 but no air will be admitted to the quick-action chamber 26 because the graduating pilot valve has closed the quick-action port 25, and this port remains closed during the movement of the pilot valve from service position to release position. In the release position of the pilot valve the equalizing chamber 55 will be connected to atmosphere through cavity 61 of the pilot valve, passage 62, cavity 41 of the main slide valve and atmospheric port 42.

The chamber 17 is shown in Fig. 1 as connected to an emergency reservoir. It is manifest that the operating pressure may be established in chamber 17 in any suitable manner and that it is not necessary to connect said chamber to an emergency reservoir. In Fig. 3 the chamber 17 is connected to chamber 12 by a by-pass passage 63 and in this passage is arranged a back-pressure check valve 65. In this arrangement the chamber 17 will be charged from the chamber 12 and will be maintained at the maximum pressure established in chamber 12. This will provide a substantially constant operating pressure in chamber 17.

The release governing valve 57 is fully described in my co-pending application Serial No. 9789, hereinbefore referred to. The graduated release operations of the diaphragm structure and the pilot valve, and the compensating operation of the pilot valve, are also fully described in the said co-pending application and need not be described herein. The means for varying the pressure in the actuating chamber 12 is the usual engineer's brake valve commonly used on all air brake apparatus and it is thought to be unnecessary to illustrate and describe it herein. The pressure in the actuating chamber may be varied and controlled by any suitable valve mechanisms.

What I claim is:

1. A diaphragm-operated device comprising a casing, an actuating diaphragm therein forming an actuating chamber, an equalizing diaphragm larger in area than the actuating diaphragm, a controlling diaphragm smaller in area than the equalizing diaphragm and forming a quick-action chamber between the equalizing diaphragm and the controlling diaphragm and forming a control pressure chamber between the controlling diaphragm and the casing, means for establishing an operating pressure in the control pressure chamber, means for varying the pressure in the actuating chamber, means actuated by the diaphragms when said diaphragms are moved toward the actuating chamber to admit fluid pressure into the quick-action chamber to assist the pressure in the control pressure chamber in moving the diaphragms toward the actuating chamber, and a device adapted to be operated by said diaphragms when they are moved by the pressures in the control pressure chamber and in the equalizing chamber.

2. A diaphragm-operated valve comprising a casing, an actuating diaphragm therein forming an actuating chamber, an equalizing diaphragm larger in area than the actuating diaphragm and forming an equalizing chamber, a controlling diaphragm smaller in area than the equalizing diaphragm and forming a quick-action chamber between the equalizing diaphragm and the controlling diaphragm and forming a control pressure chamber between the controlling diaphragm and the casing, means for establishing an operating pressure in the control pressure chamber, means for varying the pressure in the actuating chamber, means actuated by the diaphragms when said diaphragms are moved toward the actuating chamber to admit fluid pressure into the quick-action chamber to assist the pressure in the control pressure chamber in moving the diaphragms toward the actuating chamber, and a valve adapted to be operated by said diaphragms when they are moved by the pressures in the control pressure chamber and in the equalizing chamber.

3. A diaphragm-operated device comprising a casing, an actuating diaphragm therein forming an actuating chamber, an equalizing diaphragm larger in area than the actuating diaphragm, a controlling diaphragm smaller in area than the equalizing diaphragm and forming a quick-action chamber between the equalizing diaphragm and the controlling diaphragm and forming a control pressure chamber between the controlling diaphragm and the casing, means for establishing an operating pressure in the control pressure chamber, means for varying the pressure in the actuating chamber, a valve actuated by the diaphragms when said diaphragms are moved toward the actuating chamber to admit fluid pressure into the quick-action chamber to assist the pressure in the control pressure chamber in moving the diaphragms toward the actuating chamber, and a device adapted to be operated by said diaphragms when they are moved by the pressures in the control pressure chamber and in the equalizing chamber.

4. A diaphragm-operated device comprising a diaphragm, means for subjecting said diaphragm to substantially equal opposed pressures, means for varying one of said pressures to cause the diaphragm to move toward the lower pressure, means operated by the movement of said diaphragm to give to the diaphragm a quick impulse toward the lower pressure, and means operated by the quick action of said diaphragm.

5. A diaphragm-operated device comprising a diaphragm, means for subjecting said diaphragm to opposed pressures, means for varying one of said pressures to cause the diaphragm to move toward the lower pressure, fluid pressure means operated by the movement of said diaphragm to give to the diaphragm a quick impulse toward the lower pressure, and means operated by the quick action of said diaphragm.

6. A diaphragm-operated device comprising a diaphragm, means for subjecting said diaphragm to substantially equal opposed pressures, means for reducing one of said pressures to cause the diaphragm to move toward the reduced pressure, fluid pressure means operated by the movement of said diaphragm to give to the diaphragm a quick impulse toward the reduced pressure, and means operated by the quick action of said diaphragm.

7. A diaphragm-operated device comprising a diaphragm, means for subjecting said diaphragm to substantially equal opposed pressures, means for reducing one of said pressures to cause the diaphragm to move toward the reduced pressure, fluid pressure means operated by the movement of said diaphragm to give to the diaphragm a quick impulse toward the reduced pressure, and a valve operated to final position by the quick action of said diaphragm.

8. A diaphragm-operated device comprising a diaphragm, means for subjecting said diaphragm to substantially equal opposed pressures, means for reducing one of said pressures to cause the diaphragm to move toward the reduced pressure, fluid pressure means operated by the movement of said diaphragm to give to the diaphragm a quick impulse toward the reduced pressure, and a valve operated to open position by the quick action of said diaphragm.

9. A diaphragm-operated device comprising a casing, an actuating diaphragm therein forming an actuating chamber, an equalizing diaphragm larger in area than the actuating diaphragm and forming an equalizing chamber, a controlling diaphragm smaller in area than the equalizing diaphragm and forming a quick-action chamber between the equalizing diaphragm and the controlling diaphragm and forming a control pressure chamber between the controlling diaphragm and the casing, means for establishing an operating pressure in the control pressure chamber, means for varying the pressure in the actuating chamber, a pilot valve and a graduating pilot valve actuated by the diaphragms when said diaphragms are moved toward the actuating chamber to admit fluid pressure into the quick-action chamber to assist the pressure in the control pressure chamber in moving the diaphragms toward the actuating chamber, the pilot valve being operated by said diaphragms when they are moved by the pressures in the control pressure chamber and in the quick-action chamber to admit air into the equalizing chamber and to stop the flow of fluid under pressure into the quick-action chamber.

10. A diaphragm-operated device comprising a casing, an actuating diaphragm therein forming an actuating chamber, an equalizing diaphragm larger in area than the actuating diaphragm and forming an equalizing chamber, a controlling diaphragm smaller in area than the equalizing diaphragm and forming a quick-action chamber between the equalizing diaphragm and the controlling diaphragm and forming a control pressure chamber between the controlling diaphragm and the casing, means for establishing an operating pressure in the control pressure chamber, means for varying the pressure in the actuating chamber, a pilot valve and a graduating pilot valve actuated by the diaphragms when said diaphragms are moved toward the actuating chamber to admit fluid pressure into the quick-action chamber to assist the pressure in the control pressure chamber in moving the diaphragms toward the actuating chamber, the pilot valve being operated by said diaphragms when they are moved by the pressures in the control pressure chamber and in the quick-action chamber to admit air into the equalizing chamber and to stop the flow of fluid under pressure into the quick-action chamber, and means to permit the fluid pressure in the quick-action chamber to blow down to atmosphere.

11. A diaphragm-operated device for triple valves for air brake apparatus comprising a casing, an actuating diaphragm therein forming an actuating chamber, an equalizing diaphragm larger in area than the actuating diaphragm and forming an equalizing chamber, a controlling diaphragm smaller in area than the equalizing diaphragm and forming a quick-action chamber between the equalizing diaphragm and the controlling diaphragm and forming a control pressure chamber between the controlling diaphragm and the casing, means connecting the actuating chamber to a brake pipe, means connecting the equalizing chamber to a brake cylinder, means connecting the control pressure chamber to an emergency reservoir, means for varying the pressure in the actuating chamber, a valve actuated by the diaphragms when said diaphragms are moved toward the actuating chamber to admit brake pipe pressure into the quick-action chamber to assist the pressure in the control pressure chamber in moving the diaphragms toward the actuating chamber, and a valve adapted to be operated by said diaphragms when they are moved by the pressures in the control pressure chamber and in the equalizing chamber to admit brake pipe air into the equalizing chamber.

12. A diaphragm-operated device for triple valves for air brake apparatus comprising a casing, an actuating diaphragm therein forming an actuating chamber, an equalizing diaphragm larger in area than the actuating diaphragm and forming an equalizing chamber, a controlling diaphragm smaller in area than the equalizing diaphragm and forming a quick-action chamber between the equalizing diaphragm and the controlling diaphragm and forming a control pressure chamber between the controlling diaphragm and the casing, means connecting the actuating chamber to a brake pipe, means connecting the equalizing chamber to a brake cylinder, means connecting the control pressure chamber to an emergency reservoir, a valve actuated by the diaphragms when said diaphragms are moved toward the actuating chamber to admit pressure into the quick-action chamber to assist the pressure in the control pressure chamber in moving the diaphragms toward the actuating chamber, and a valve adapted to be operated by said diaphragms when they are moved by the pressures in the control pressure chamber and in the equalizing chamber to admit air into the equalizing chamber.

13. A triple valve for air brake apparatus comprising a casing, a main slide valve, a piston connected thereto and adapted to move in response to variations in brake pipe pressure, an actuating diaphragm forming an actuating chamber, an equalizing diaphragm larger in area than the actuating diaphragm and forming an equalizing chamber, a controlling diaphragm smaller in area than the equalizing diaphragm and forming a quick-action chamber between the equalizing diaphragm and the controlling diaphragm and forming a control pressure chamber between the controlling diaphragm and the casing, means connecting the actuating chamber to a brake pipe, means connecting the equalizing chamber to a brake cylinder, means connecting the control pressure chamber to an emergency reservoir, a valve actuated by the diaphragms when said diaphragms are moved toward the actuating chamber to admit air under pressure into the quick-action chamber to assist the pressure in the control pressure chamber in moving the diaphragms toward the actuating chamber, and a valve adapted to be operated by said diaphragms when they are moved by the pressures in the control pressure chamber and in the equalizing chamber to admit air into the equalizing chamber.

14. A triple valve for air brake apparatus comprising a casing, a main slide valve, a piston connected thereto and adapted to move in response to variations in brake pipe pressure, an actuating diaphragm forming an actuating chamber, an equalizing diaphragm larger in area than the actuating diaphragm and forming an equalizing chamber, a controlling diaphragm smaller in area than the equalizing diaphragm and forming a quick-action chamber between the equalizing diaphragm and the controlling diaphragm and forming a control pressure chamber between the controlling diaphragm and the casing, means connecting the actuating chamber to a brake pipe, means connecting the equalizing chamber to a brake cylinder, means connecting the control pressure chamber to an emergency reservoir, a pilot valve and a graduating pilot valve actuated by the diaphragms when said diaphragms are moved slightly toward the actuating chamber to admit air under pressure into the quick-action chamber the said valves being operated by said diaphragms when they are moved to final positions by the pressures in the control pressure chamber and in the equalizing chamber to admit air into the equalizing chamber and to stop the flow of air into the quick-action chamber, and means to permit the air in the quick-action chamber to flow to atmosphere.

15. A diaphragm-operated device for a triple valve for air brake apparatus comprising a diaphragm, means for subjecting said diaphragm to opposed pressures from the brake pipe, a brake cylinder and an emergency reservoir, means for reducing the brake pipe pressure to cause the diaphragm to move toward the reduced brake pipe pressure, means operated by the movement of said diaphragm to give to the diaphragm a quick impulse toward the reduced brake pipe pressure, and means operated by the quick action of said diaphragm to admit air to a brake cylinder.

16. A triple valve for air brake apparatus comprising a casing, a main slide valve, a piston connected thereto and adapted to move in response to a reduction in brake pipe pressure to connect an auxiliary reservoir to a brake cylinder, a diaphragm, means for subjecting said diaphragm to opposed pressures from the brake pipe, a brake cylinder and an emergency reservoir and operating upon a reduction of brake pipe pressure to cause the diaphragm to move toward the reduced brake pipe pressure, means operated by a slight movement of said diaphragm to give to the diaphragm a quick impulse toward the reduced brake pipe pressure, and means operated by the final quick action of said diaphragm to admit brake pipe air to a brake cylinder.

In testimony whereof I hereunto affix my signature.

SPENCER G. NEAL.